(12) United States Patent
Fang

(10) Patent No.: US 11,203,807 B2
(45) Date of Patent: Dec. 21, 2021

(54) COATING FOR A CARRIER MATERIAL, CORE PART FOR PRODUCING A COMPOSITE PART, COMPOSITE PART, AND METHOD FOR PRODUCING A COMPOSITE PART

(71) Applicant: Universität Siegen, Siegen (DE)

(72) Inventor: Xiangfan Fang, Rodgau (DE)

(73) Assignee: Universität Siegen, Siegen (DE)

( * ) Notice: Subject to any disclaimer, the term of this patent is extended or adjusted under 35 U.S.C. 154(b) by 35 days.

(21) Appl. No.: 16/345,822

(22) PCT Filed: Nov. 23, 2017

(86) PCT No.: PCT/EP2017/080261
§ 371 (c)(1),
(2) Date: Apr. 29, 2019

(87) PCT Pub. No.: WO2018/096055
PCT Pub. Date: May 31, 2018

(65) Prior Publication Data
US 2019/0271067 A1 Sep. 5, 2019

(30) Foreign Application Priority Data
Nov. 24, 2016 (DE) ...................... 10 2016 122 664.5

(51) Int. Cl.
| | | |
|---|---|---|
| *C23C 2/12* | (2006.01) | |
| *B22D 19/00* | (2006.01) | |
| *B22D 19/16* | (2006.01) | |
| *B22D 21/00* | (2006.01) | |
| *C23C 2/26* | (2006.01) | |
| *C23C 30/00* | (2006.01) | |
| *C23C 28/02* | (2006.01) | |
| *B23K 103/16* | (2006.01) | |
| *B23K 35/00* | (2006.01) | |

(52) U.S. Cl.
CPC ............ *C23C 2/12* (2013.01); *B22D 19/0081* (2013.01); *B22D 19/16* (2013.01); *B22D 21/007* (2013.01); *C23C 2/26* (2013.01); *C23C 28/025* (2013.01); *C23C 30/00* (2013.01); *B23K 35/002* (2013.01); *B23K 35/004* (2013.01); *B23K 2103/166* (2018.08); *Y10T 428/12757* (2015.01)

(58) Field of Classification Search
None
See application file for complete search history.

(56) References Cited

U.S. PATENT DOCUMENTS 6,610,423 B2 * 8/2003 Sugimaru ................. C23C 2/06
428/659

FOREIGN PATENT DOCUMENTS

| | | |
|---|---|---|
| CA | 2024210 A1 | 5/1991 |
| DE | 1260708 A | 2/1968 |
| DE | 2841446 A1 | 12/1979 |
| DE | 19836706 A1 | 10/1999 |
| DE | 10113962 A1 | 10/2002 |
| DE | 102004010763 A1 | 9/2005 |
| DE | 102004029070 A1 | 1/2006 |
| DE | 102004031164 A1 | 1/2006 |
| EP | 0427389 A1 | 5/1991 |
| EP | 1013785 A1 | 6/2000 |
| FR | 2758571 A1 * | 7/1998 |
| FR | 2758571 A1 | 7/1998 |
| GB | 2023665 A | 1/1980 |

OTHER PUBLICATIONS

Jenner, Frank [u.a.]: Evolution of phases, microstructure, and surface roughness during heat treatment of aluminized low carbon steel. In: Metallurgical and Materials Transactions A: Physical Metallurgy and Materials Science. 2010, Bd. 41, H. 6, S. 1554-1563. ISSN 1543-1940 (e); 0360-2133; 1073-5623 (p). DOI: 10.1007/s11661-009-0105-x.

Springer, H. [u.a.]: On the formation and growth of intermetallic phases during interdiffusion between low-carbon steel and aluminum alloys. In: Acta Materialia. 2011, Bd. 59, H. 4, S. 1586-1600. ISSN 1873-2453 (e); 1359-6454 (p). DOI: 10.1016/j.actamat.2010.11.023.

Suehiro, M. [u.a.]: Properties of aluminum-coated steels for hot-forming. In: Nippon Steel Technical Report (NSTR). 2003, Bd. 88, S. 16-21. ISSN 0300-306X (p).

European Patent Office; Search Report in related International Patent Application No. PCT/EP2017/080261 dated Feb. 2, 2018; 6 pages.

European Patent Office; Written Opinion in related International Patent Application No. PCT/EP2017/080261 dated Feb. 2, 2018; 7 pages.

German Patent Office; Search Report in related German Patent Application No. 10 2016 122 664.5 dated Sep. 18, 2017; 10 pages.

Fang, Xiangfan: Evaluation of Coating Systems for Steel Aluminum Hybrid Casting; Journal of Materials Science and Engineering, A 7 (3-4)(2017) 51-67; doi: 10.17265/2161-6213/2017.3-4.001; David Publishing.

* cited by examiner

*Primary Examiner* — Daniel J. Schleis
(74) *Attorney, Agent, or Firm* — Dorton & Willis, LLP

(57) ABSTRACT

A coating for a carrier material made of a steel material for joining to an aluminum material includes a first sublayer on the core part side and a second sublayer on the outside. On average, the coating includes approximately 1 to 10 wt. % silicon and iron, the remainder being aluminum. The first sublayer at least approximately includes 42 wt. % iron, 11 wt. % silicon, and no more than approximately 45 wt. % aluminum, which constitutes the remainder, and has a thickness of no more than approximately 3.5 μm. The second sublayer includes approximately 1 to 10 wt. % silicon, the remainder being aluminum, and has a thickness of approximately 5 to approximately 95 μm.

16 Claims, 3 Drawing Sheets

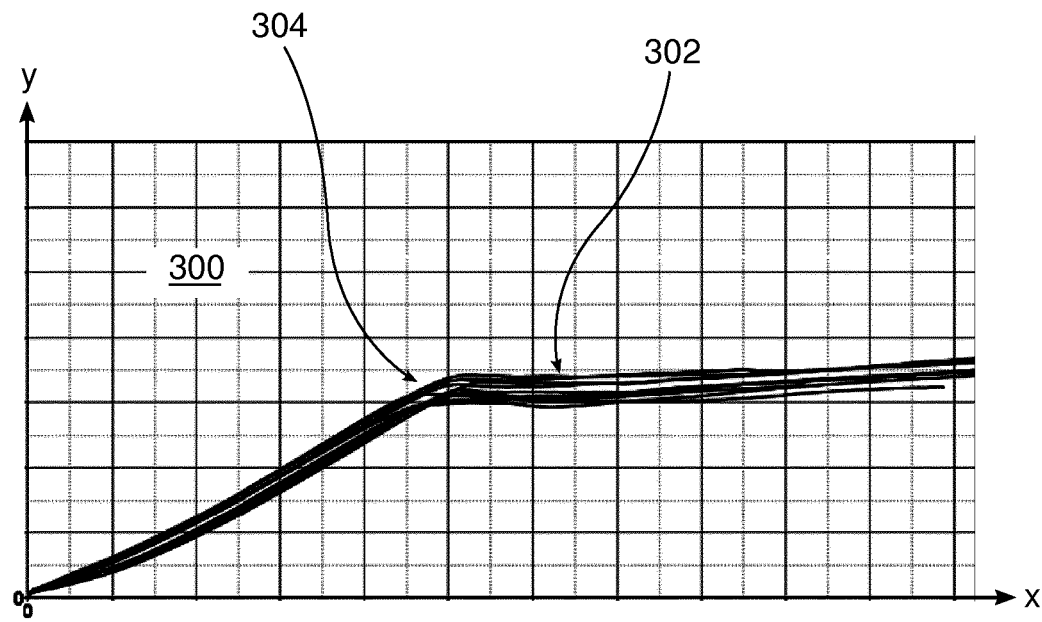
Fig. 3
Fig. 4:
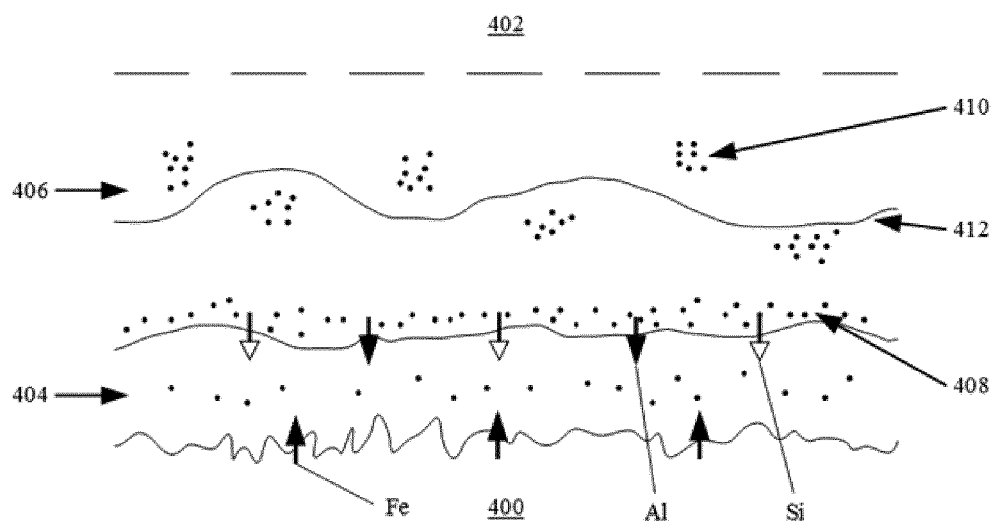

Fig. 5
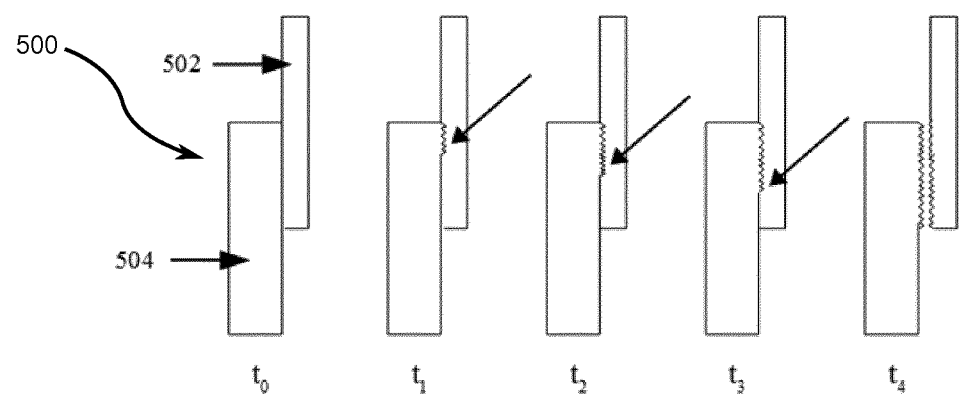
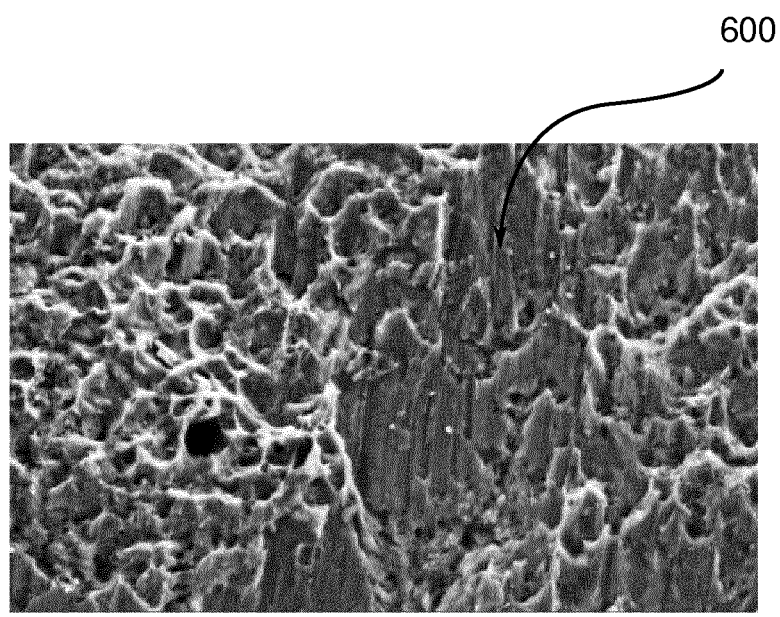
Fig. 6

COATING FOR A CARRIER MATERIAL, CORE PART FOR PRODUCING A COMPOSITE PART, COMPOSITE PART, AND METHOD FOR PRODUCING A COMPOSITE PART

CROSS-REFERENCE TO RELATED APPLICATIONS

This application is a national phase application under 35 U.S.C. § 371 of International Patent Application No. PCT/EP2017/080261, filed Nov. 23, 2017 (pending), which claims the benefit of priority to German Patent Application No. DE 10 2016 122 664.5 (pending), filed Nov. 24, 2016, the disclosures of which are incorporated by reference herein in their entirety.

TECHNICAL FIELD

The invention relates to a coating for a carrier material made of a steel material for joining to an aluminum material, to the coating comprising a first sublayer on the core part side and a second sublayer on the outside. The invention furthermore relates to a core part for producing a composite part. The invention furthermore relates to a composite part. The invention furthermore relates to a method for producing a composite part.

BACKGROUND

A method is known from DE 10 2004 031 164 A1 for producing a composite body made of a cast-in body and casting material. A coating system comprising two layers is proposed. These two layers have differing compositions and melting temperatures. The two layers are applied by way of spray processes in the form of drops, wherein a kind of integrated or blended structure of the layers can result due to independent solidification of the components of the two layers. The first layer, which is usually located closest to the component, is applied by spraying on a liquid metal alloy, which is preferably made of Fe or Fe alloys comprising 2 to 99 wt. % Fe, such as FeCr. The layer has a higher melting temperature. The joint is purely a metal bond. The second layer, which is usually provided on top of the first layer, but also within the first layer, is likewise applied by spraying on metal alloys having a low melting point. These alloys can be Al, AlSi12, Al+Cu, in particular AlCu25-45 or Al+Mg, in particular AlMg20-80 or Al+Zn, in particular AlZn>60. This two-component coating acts as follows: When the casting metal, such as Al casting alloys, is cast around the cast-in body, the second alloy layer having a low melting point is melted, and blended and combined with the Al casting. Since these two layers are integrated and blended with one another in terms of the structure, a kind of microscopic form fit is created between the casting metal and the first coating after the second layer has been melted and the first layer is still present, which in turn is joined to the base metal/cast-in body.

The use of an Al—Si coating is known in the field of hot forming technology. The Al—Si coating, on the one hand, is to prevent scaling of steel during austenitization (approximately 900° C.) and, on the other hand, is to protect the steel against corrosion in day-to-day use. This coating is based on the coating known from FR 2 758 571 A1. It is proposed in FR 2 758 571 A1 to coat a steel sheet on both sides with a layer. For this purpose, a first sublayer comprising 95 to 98 wt. % aluminum and less than 4 wt. % iron is generated on top of a second sublayer. The second sublayer comprises 40 to 65 wt. % Al, 30 to 50 wt. % Fe and 3 to 12 wt. % of one or more elements having atomic diameters within 15% of that of Fe. Moreover, a method is described, in which a steel sheet is dipped into a melt comprising 88 to 95 wt. % Al and 7 to 12 wt. % other elements, so as to generate the second sublayer. After excess alloy has been removed, a 3 to 7 µm thick second sublayer remains. Thereafter, the steel sheet is dipped into an Al melt so as to generate the first sublayer. As a result, two separate process steps are carried out.

A coating is known from EP 1 013 785 A1, which can be used for hot forming sheet steel materials so as to avoid oxidation, decarburization and corrosion. This coating is an Al or Al alloy and is able to form an Al-, Fe- and Si-based intermetallic compound. This coating is composed of 9 to 10 wt. % Si and 2 to 3.5 wt. % Fe, the remainder being Al and impurities, and is 5 to 100 µm thick. This layer can also comprise 2 to 4 wt. % Fe, the remainder being Al and impurities, and be between 15 and 100 µm thick. The final coating is created by way of heat treatment at temperatures higher than 700° C., resulting in the formation of an Al-, Si- and Fe-based intermetallic alloy compound on the steel surface, which offers protection against corrosion and decarburization of the steel. This layer may include different phases, which depend on the heat treatment and have high hardness in excess of 600 HV. This layer can furthermore exhibit a lubricating function at higher temperatures, which favors the hot forming of the sheet steel. The aforementioned heat treatment of more than 700° C. is implemented by process conditions of the hot forming process of the sheet steel. This coating is used for hot forming or heat treating sheet steel.

These known coatings are used in the production of hot-formable sheet steels and referred to by ArcelorMittal as Usibor® 1500 and by thyssenkrupp as MBW® 1500. In the process, a layer thickness of approximately 20 to 30 µm comprising 7 to 11% Si, the remainder being aluminum, is used. The layer thickness of the first layer lying close to the steel is usually 5 to 7 µm, while the thickness of the second layer is approximately 25 µm. This coating is only later converted to an Al—Fe—Si-based intermetallic compound by subsequent heat treatment, after the steel has been produced using coating processes.

Subsequent to a heat treatment process at 950° C., the outer surface of the coating comprises 7 to 11 wt. % Si, the Al content initially decreases from approximately 50 wt. % to approximately 30 wt. %, before increasing again to 50 wt. %, and decreases again toward the steel interfaces.

Scientific fundamental research shows that the bonds created between steel and aluminum when steel inserts are dipped into an Al melt take on the form of a variety of intermetallic phases (IMP). Proceeding from steel (α-Fe), it is possible to create η-Al$_5$Fe$_2$, Θ-Al$_3$Fe, α-Al or α-Fe, η-Al$_5$Fe$_2$, Θ-Al$_3$Fe, α$_c$-AlFeSi, in this order, ending with the solidified Al melt (α-Al). Almost all layers are very brittle due to the low crystal lattice symmetry. Only the α$_c$-AlFeSi phase may be ductile given the cubic lattice structures.

It is known from the publication "H. Springer, A. Kostka, E. J. Payton, D. Raabe, A. Kaysser-Pyzalla, G. Eggeler, On the formation growth of intermetallic phases during inter-duffsion between low-carbon steel and aluminium alloys. Acta Materialia 59, 2010, p 1586-1660" that the more brittle Al-rich intermetallic phases always form first when steel is dipped into an Al melt due to the kinetics of the process. The more ductile IMP forms with great difficulty and always last, if this is still possible at all.

The composition of the Al alloys plays a crucial role in the growth of the IMP layers and, consequently, for the thickness of the IMP layers. However, information provided in scientific publications is conflicting. While Springer learned that, in an Al melt, Si slows the growth of the IMP layer, and the growth of the IMP accelerates during diffusion annealing between steel and Al, the publications "M. Suehiro, K. Kusumi, T. Miyakoshi, J. Maki, and M. Ohgami, Nippon Steel Report No. 88, Nippon Steel, Tokyo, Japan, 2003." and "F. Jenner, M. E. Walter, R. Iyenger and R. Hughes, Evolution of Phases, Microstructure, and Surface Roughness during Heat Treatment of Aluminized Low Carbon Steel, Metallurgical and Materials Transactions A, 41 A, June 2010, p. 1554-1563" show that Si, in general, decelerates the layer growth of the IMPs.

SUMMARY

It is the object of the invention to improve an above-described core part structurally and/or functionally. It is furthermore the object of the invention to improve an above-described composite part structurally and/or functionally. It is furthermore the object of the invention to improve above-described methods. In particular, it is the object of the invention to develop methods and coatings by way of which a ductile integral bond having sufficient strength can be created between steel and aluminum with steel-aluminum composite casting, the bond also being fraught with little variance and able to withstand dynamic stress, enabling real-life use in motor vehicle construction and similar fields. The goal is also to then be able to employ this coating in related processes, such as brazing and welding, for joining steel and aluminum. In doing so, scientific fundamental research conducted over the last 50 years is resorted to, and the following ideas are created: creating a multi-layer system comprising, among other things, a very thin, more ductile layer made of Fe, Al and Si using appropriate coating processes. In particular, an Fe—Al—Si layer having a favorable crystal lattice structure, which is to say the highest possible crystal lattice symmetry, is to be created, since these have more dislocation glide systems and can therefore be deformed in a ductile manner.

The object is achieved by a coating, a core part, a composite part, and methods as disclosed herein.

The core part can be used to receive an outer part made of an aluminum material. The core can have a surface. The coating can be provided on the surface. The core can be coated partially or completely by the coating. The coating can be used to form a composite zone with an aluminum material to be joined to the core part by way of a joining process. The coating can comprise at least two sublayers. The first sublayer can be disposed directly on the core made of a steel material. The first sublayer can be disposed between the core and the second sublayer. The second sublayer can be disposed on the first sublayer. The alloying elements of the coating can be distributed differently in each layer. An average occurrence of alloying elements may refer to an overall thickness of the coating across the first sublayer and the second sublayer. The alloying elements of the first sublayer can be distributed at least approximately homogeneously or inhomogeneously. The alloying elements of the second sublayer can be distributed at least approximately homogeneously or inhomogeneously. The core, the coating, the first sublayer and/or the second sublayer can include common contaminations.

The thickness of the second sublayer can be several times that of the first sublayer. Together with a fused aluminum material, the coating can create a ductile integral bond between the steel material and the aluminum material. The carrier material can be a sheet steel. The carrier material can be a steel component. The steel material of the carrier material can be a low alloy steel. The steel material of the carrier material can be a high alloy steel.

The composite part can comprise such a core part and an outer part that is joined to the core part and made of an aluminum material. After a joining process, the steel material and the coating of the core part are joined via a composite zone, especially by way of a ductile integral bond. These bonds may be supplemented partially/locally by a microscopic form-locked joint. The aluminum material of the outer part can comprise at least approximately 5 wt. %, and no more than 14 wt. %, silicon (Si). The aluminum material of the outer part can comprise further alloying elements, in particular magnesium (Mg), manganese (Mn), iron (Fe) and/or copper (Cu), in the customary amounts. The aluminum material of the outer part can comprise common impurities.

The composite part can comprise a composite zone having shear tensile strength of at least 10 MPa between the core part and the outer part. A fracture surface of the composite zone can show a typical ductile appearance, such as a honeycomb structure.

The composite part can be a vehicle component. The composite part can be a car body component. The composite part can be a chassis component. The composite part can be a structural component. The composite part can form a node. The composite part can form a component comprising reinforcements by Al ribs or additional reinforcements. The composite part can be an electronics component.

The composite part can be produced in a composite casting process. The composite part can be produced in a die casting process. The composite part can be produced in a sand casting process or a permanent mold casting process. The composite part can be produced in a welding process or brazing process. The aluminum material of the outer part can have a temperature of no more than approximately 720° C. when the core part is cast-in in a die casting process. The core part and the outer part can be joined to one another in a welding or brazing process.

In summary and in other words, the invention thus yields, among other things, a coating for enabling a ductile integral bond between steel and aluminum.

It is possible to generate a multi-layer system comprising a layer made of Fe, Al and Si. The layer can be very thin and ductile. The layer can be generated by appropriate coating processes. In particular, an Fe—Al—Si layer having a favorable crystal lattice structure, which is to say the highest possible crystal lattice symmetry, is to be created, since this can have more dislocation glide systems, and can therefore be deformed in a ductile manner.

This object is achieved, for example, by a layer system that, in chemical terms, is made of pure Al including, on average, 1 to 10% added Si and comprising two different sublayers. A first Fe layer, or layer lying close to the steel, can comprise at least 42 wt. % Fe and at least 11 wt. % Si, the remainder being Al at less than 45 wt. %, so that an intermetallic phase having stoichiometry of at least approximately $Al_{57}Fe_{27}Si_{15}$ forms, which can also be referred to as an $\alpha_2+Fe_2Al_5$ mixture. This substance, or this substance mixture, has a cubic or an ordered almost cubic lattice structure according to the established Fe—Al—Si phase diagram. This lattice structure has a higher crystal symmetry and thus a large number of dislocation glide systems. As a result, this intermetallic phase is deformable and ductile. As a result of this thin, more ductile layer, a secure, more ductile integral bond is established between the Al—Si alloy layer and steel, which goes beyond the usual metallic bonds.

The above-described composition according to the Fe—Al—Si phase diagram is at a boundary of ductile and brittle phases. Phase diagrams themselves are usually subject to significant uncertainty, which is caused by a complexity of the alloy system and measuring inaccuracy. Moreover, the boundary of phase lines in a phase diagram is dependent on the cooling rate of an alloy. The established phase diagrams usually indicate the phase boundaries in the state of equilibrium, which is to say with an infinitely slow cooling rate. In practice, however, the cooling rate is faster, whereby the phase boundaries shift.

It is therefore quite possible that the lattice structure of an intermetallic phase (IMP) in the first sublayer still entirely or partially has a reduced crystal lattice symmetry. In this way, a layer thickness of this layer can be very thin, measuring no more than 3.5 μm. In this way, the ductility of the layer can be preserved even with minor deviations of a chemical composition from the above-described values, whereby the lattice structure can take on lesser symmetry.

Subsequent to this thin first IMP layer, a thicker layer having an average Si content of between 1 and 10 wt. %, and in particular 7 to 10 wt. %, can follow, the remainder of the composition consisting only of Al, apart from the customary impurities. It is possible that no Fe elements are present in this layer, except for impurities. The layer thickness can advantageously range between 5 and 15 μm. It may also be considerably thicker.

Both sand casting or sand casting-like methods, such as plaster casting, and die casting can be used for composite casting so as to generate an integral bond. Customary Al alloys can be used for casting. Since these, in general, include Si, the formation of thin IMP layers is favored. For example, an Al-9-11 wt. % Si cast alloy can be used.

Moreover, this coating is used for fusion welding or brazing between steel and Al, wherein the layer thickness of the coating can be thicker in these instances, for example up to 100 μm.

In particular optional features of the invention are denoted by "can." Accordingly, there is a respective exemplary embodiment of the invention that includes the respective feature or the respective features.

The invention enhances a capacity to withstand dynamic stresses. Resistance to breaking is enhanced. Crash resistance is enhanced. Series production is made possible or facilitated. A ductile integral bond having particular strength between a steel material and an aluminum material is provided. Random defects are reduced. Use in vehicle construction and/or in similar fields is made possible.

Exemplary embodiments of the invention will be described hereafter in greater detail with reference to the figures. Further features and advantages will be apparent from this description. Specific features of these exemplary embodiments can represent general features of the invention. Features of these exemplary embodiments that are combined with other features can also represent individual features of the invention.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIG. 3 shows a diagram with results from shear tensile experiments of samples comprising a core part comprising an Fe—Al—Si coating and an outer part made of an aluminum material;

FIG. 4 shows a ductile integral bond between a steel material and an aluminum material;

FIG. 5 shows stable crack propagation on a shear tensile sample; and

FIG. 6 shows a fracture surface of a composite zone between a core part and an outer part.

DETAILED DESCRIPTION

Figure 1:
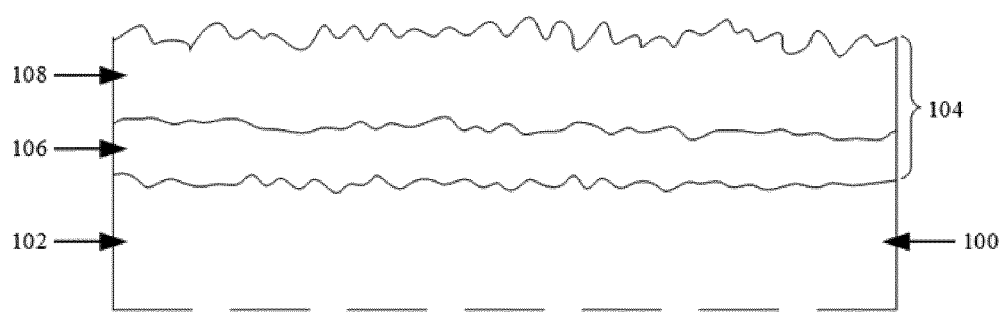
FIG. 1 shows a micrograph of a core part comprising a core made of a steel material and an Fe—Al—Si coating comprising a first sublayer and a second sublayer.

FIG. 1 shows a micrograph of a core part 100 comprising a core 102 made of a steel material and an Fe—Al—Si coating 104 comprising a first sublayer 106 and a second sublayer 108.

The core 102 is a sheet steel in the present example. The coating 104 is used for joining to an aluminum material. The coating 104, on average, comprises approximately 1 to approximately 10 wt. % silicon (Si) and iron (Fe), the remainder being aluminum (Al). The first sublayer 106 is located between the core part 100 and the second sublayer 108. The first sublayer 106 comprises at least approximately 42 wt. % iron (Fe), at least approximately 11 wt. % silicon (Si), and no more than approximately 45 wt. % aluminum (Al), which constitutes the remainder. The coating 104 can be applied in a PVD process or by way of other processes, such as hot dip coating and the like. The first sublayer 106 has a thickness of no more than approximately 3.5 μm, and in particular of no more than 3 μm. The second sublayer 108 is disposed on the first sublayer 106 and forms an outer side of the core part 100. The second sublayer 108 comprises approximately 1 to approximately 10 wt. % silicon (Si), and in particular approximately 7 to approximately 10 wt. % silicon (Si), the remainder being aluminum (Al). Iron (Fe) is not present, except for traces/impurities. The second sublayer 108 has a thickness of approximately 5 to approximately 95 μm.

Figure 2:
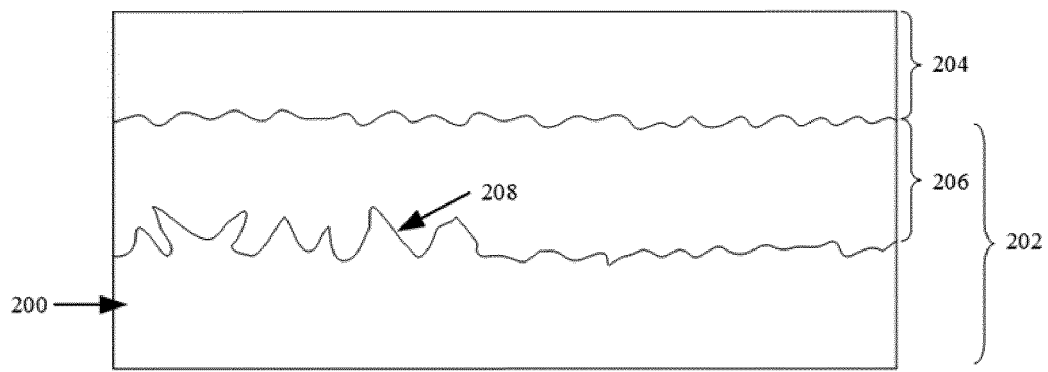
FIG. 2 shows a micrograph of a composite part comprising a core part comprising an Fe—Al—Si coating and an outer part made of an aluminum material.

FIG. 2 shows a micrograph of a composite part 200 subsequent to a joining process, comprising a core part 202 comprising an Fe—Al—Si coating, such as the core part 100 according to FIG. 1, and an outer part 204 made of an aluminum material. The aluminum material of the outer part 204 comprises at least approximately 5 wt. % and no more than approximately 14 wt. % silicon (Si) and, optionally, further alloying elements, in particular magnesium (Mg), manganese (Mn), iron (Fe) and/or copper (Cu), as well as other customary alloying elements in an Al casting or Al wrought alloys.

So as to produce the composite part 200, the coated core part 202 is cast in with an aluminum material forming the outer part 204. The fused aluminum material has a temperature of no more than approximately 720° C. in the case of a die casting process. As an alternative, the aluminum material forming the outer part 204 can also be applied in a welding or brazing process.

After the outer part 204 has been applied, the steel material and the coating of the core part are integrally bonded to one another, supplemented with local microscopic form fit 208. A composite zone 206 having shear tensile strength of at least 10 MPa is formed between the core part 202 and the outer part 204.

In addition, reference is made in particular to FIG. 1 and the associated description on a supplementary basis.

FIG. 3 shows a diagram 300 with shear tensile test results of shear tensile samples comprising a core part comprising an Fe—Al—Si coating, such as the core part 100 according to FIG. 1 and the core part 202 according to FIG. 2, and an outer part, such as the outer part 204 according to FIG. 2, made of an aluminum material.

In the diagram 300, a distance is plotted on an x-axis, and a force is plotted on a y-axis. The shear tensile test yielded force/distance curves 302 for the samples. It is apparent that the force, after reaching a maximum or break point 304 and after an initial elastic linear increase, remains constant for a very long time or increases slightly. The break point can be considered the start of the crack formation. An integral bond between the coated core part and the outer part thus has both high strength and high ductility. The curves 302 are from different test series, and very little variance is apparent.

In addition, reference is made in particular to FIG. 1 and FIG. 2, and the associated description on a supplementary basis.

FIG. 4 shows the mechanisms for forming a ductile integral bond between a steel material 400 and an aluminum material 402 during a coating process. Fe diffused into a first sublayer 404 from the steel material 400, resulting in an intermetallic phase having stoichiometry of approximately $Al_{57}Fe_{27}Si_{15}$. The second sublayer 406 comprises Si enrichments 408 and Si segregations 410. Si and Al diffused into the first sublayer 404 from the second sublayer 406.

A shear tensile test conducted with samples from the composite part 200 or 500 results in a crack curve 412 having stable crack propagation in the formerly second sublayer of the coating, and the bond is ductile, whereby the bond is not instantly destroyed. In addition, reference is made in particular to FIG. 1, FIG. 2 and FIG. 3, and the associated description, on a supplementary basis.

FIG. 5 shows stable crack propagation on a shear tensile sample 500. The shear tensile sample 500 comprises a core part 502 made of a steel material and an outer part 504 made of an aluminum material. A ductile integral bond was created between the core part 502 and the outer part 504 by way of an Fe—Al—Si coating of the core part 502. The propagation of the crack formation is marked by an arrow in the illustrations. In addition, reference is made in particular to FIG. 1, FIG. 2, FIG. 3 and FIG. 4, and the associated description, on a supplementary basis.

FIG. 6 shows a fracture surface 600 of the composite zone between the core part 502 and the outer part 504. The fracture surface 600 shows a typical ductile appearance having a honeycomb structure. In addition, reference is made in particular to FIG. 1, FIG. 2, FIG. 3, FIG. 4 and FIG. 5, and the associated description, on a supplementary basis.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMERALS 100 core part
102 core
104 coating
106 first sublayer
108 second sublayer
200 composite part
202 core part
204 outer part
206 composite zone
208 microscopic form fit
300 diagram
302 force/distance curves
304 maximum, break point
400 steel material
402 aluminum material
404 first sublayer
406 second sublayer
408 Si enrichment
410 Si segregation
412 crack curve
500 shear tensile sample
502 core part
504 outer part
600 fracture surface

What is claimed is:

1. A coating for a carrier material made of a steel material adapted for joining to an aluminum material, the coating comprising:
   a first sublayer on a core part side; and
   a second sublayer disposed on the first sublayer and forming an outer side of the coating;
   the coating, on average, comprising approximately 1 to approximately 10 weight percent each of silicon and iron, the remainder being aluminum;
   the first sublayer at least approximately comprising 42 weight percent iron, at least approximately 11 weight percent silicon, and no more than approximately 45 weight percent aluminum, which constitutes the remainder;
   the first sublayer having a thickness of no more than approximately 3.5 μm;
   the second sublayer comprises approximately 7 to approximately 10 weight percent silicon, the remainder being aluminum; and
   the second sublayer having a thickness of approximately 5 to approximately 95 μm.

2. The coating of claim 1, wherein the first sublayer has a thickness of no more than approximately 3 μm.

3. The coating of claim 1, wherein the coating, when joined together with a fused aluminum material, creates a ductile integral bond between the steel material and the aluminum material.

4. A core part for producing a composite part, the core part comprising:
   a carrier material made of a steel material; and
   a coating according to claim 1 applied to the carrier material.

5. The core part of claim 4, wherein the carrier material is a steel sheet or a steel component.

6. The core part of claim 4, wherein the steel material of the carrier material is a low alloy steel or a high alloy steel.

7. A composite part comprising:
a core part according to claim 4; and
an outer part joined to the core part, the outer part comprising aluminum material.

8. The composite part of claim 7, wherein the steel material and the coating of the core part are microscopically joined to one another in a form-fit manner after joining.

9. The composite part of claim 7, wherein the aluminum material of the outer part comprises at least approximately 5 weight percent and no more than approximately 14 weight percent silicon.

10. The composite part of claim 9, wherein the aluminum material of the outer part comprises further alloying elements.

11. The composite part of claim 10, wherein the further alloying elements comprise at least one of magnesium, manganese, iron, or copper.

12. The composite part of claim 7, comprising a composite zone between the core part and the outer part, the composite zone having shear tensile strength of at least 10 MPa (1450 psi).

13. The coating of claim 1, wherein the first and second sublayers are configured to form a composite zone between the carrier material and the aluminum material.

14. A method for producing a composite part of claim 7, wherein the composite part is produced in a composite casting process.

15. The method according to claim 14, comprising:
maintaining a temperature of the aluminum material of the outer part at no more than approximately 720 degrees Celsius (1328 Fahrenheit) when the core part is cast-in in a die casting process.

16. A method for producing a composite part according to claim 7, the method comprising joining the core part and the outer part to one another in one of a welding process or a brazing process.

* * * * *